United States Patent [19]

Henning et al.

[11] Patent Number: 4,998,226

[45] Date of Patent: Mar. 5, 1991

[54] HYDROPHONE

[75] Inventors: Michael L. Henning; Alan C. Curtis, both of Somerset, Great Britain

[73] Assignee: GEC-Marconi Limited, Stanmore, England

[21] Appl. No.: 381,086

[22] Filed: Jul. 18, 1989

[30] Foreign Application Priority Data

Jul. 20, 1988 [GB] United Kingdom ............... 8817256

[51] Int. Cl.⁵ ............................................. H04R 00/00
[52] U.S. Cl. ...................................... 367/149; 367/176
[58] Field of Search ................. 367/20, 140, 141, 149, 367/154, 155, 158, 162, 169, 176; 181/122; 73/653, 655–657; 350/96.29, 96.30

[56] References Cited

U.S. PATENT DOCUMENTS

| | | | |
|---|---|---|---|
| 2,762,032 | 9/1956 | Vogel | 367/154 |
| 2,837,731 | 6/1958 | Harris | 367/154 |
| 4,405,198 | 9/1983 | Taylor | 367/149 |
| 4,471,474 | 9/1984 | Fields | 367/149 |

FOREIGN PATENT DOCUMENTS 2189110 10/1987 United Kingdom .

*Primary Examiner*—Brian Steinberger
*Attorney, Agent, or Firm*—Fleit, Jacobson, Cohn, Price, Holman & Stern

[57] ABSTRACT

Inertially insensitive optical fibre hydrophones are described, utilizing materials and configurations to obtain acceleration balanced designs suitable for underwater applications where acceleration is a problem. Balancing and/or insensitivity is obtained both in longitudinal and axially perpendicular directions. Acoustic sensitivity of a coil formed by the fibre is maintained by the properties of materials used to provide a rigid former, encapsulant material and secondary material which form the hydrophone.

10 Claims, 3 Drawing Sheets

HYDROPHONE

FIELD OF THE INVENTION

The present invention relates to hydrophones and more particularly to inertially insensitive optical fibre hydrophones.

DESCRIPTION OF THE PRIOR ART

Like all hydrophones the optical fibre version is subject to inertial or acceleration sensitivity, due to its own mass: that is, it cannot tell whether it is "seeing" an acceleration or a static force such as an acoustic pressure. This sensitivity sensor depends upon the detailed design of the as well s the intrinsic transduction mechanism, and can be reduced by a "balanced" design which nulls the effect of the acceleration, or by appropriate design and choice of materials which renders the design inherently inertially insensitive.

In a underwater towed array of acoustic sensors, the vibration levels can be very high, and the hydrophone inertial sensitivity needs to be correspondingly low; this applies to accelerations both along and across the array. To achieve this, balanced designs need to be used in general and a variety of methods are used in piezoelectric technology to achieve this.

The present invention is concerned with a particular approach to balancing a fibre hydrophone in the longitudinal and perpendicular directions, for use in towed arrays and other under water applications. The invention will be described with particular reference to a towed array, but is also relevant to dunking sonars and sonobuoys.

In most towed arrays, the hydrophones are mounted from the strain members, which can be two or more. The forcing function causing the unwanted acceleration outputs is applied via these strain members. It is assumed that the hydrophone will be fastened to these strain members, since these are the only structural elements in the array.

One way of obtaining balancing of a fibre coil, in the longitudinal direction is shown in co-pending G. B. application No. 8606552, and is an extension of standard practice. However, this does not automatically compensate in the perpendicular direction, and might be difficult to realise as a device with a single fixing. Another example of standard practice in conventional hydrophones is where the piezo stack is attached at each end to plates which are attached to the source of the acceleration; the pressure sensitivity is unbalanced while longitudinal acceleration is balanced.

SUMMARY OF THE INVENTION

An aim of the present invention is to provide some configurations in which some principles similar to those disclosed in co-pending G. B. application No. 8606552 are used to achieve longitudinal and perpendicular balancing while preserving acoustic sensitivity, with some novel features involving the use of appropriate materials.

STATEMENT OF THE OBJECTS OF INVENTION

According to the present invention there is provided a hydrophone comprising a rigid former arranged to be attached to strain members, the rigid former being arranged to accommodate an encapsulant material in which is embedded an optical fibre coil, whereby the acoustic sensitivity of the coil is maintained by the properties of materials used to provide the rigid former and the encapsulant material.

According to an aspect of the present invention there is provided a hydrophone having a secondary material between the rigid former and the encapsulant material, the secondary material being of lower modulus than the encapsulant material.

According to a further aspect of the invention there is provided a hydrophone having a secondary material which surrounds the encapsulant material, the secondary material being of lower modulus than the encapsulant material.

BRIEF DESCRIPTION OF THE DRAWINGS

Embodiments of the present invention will now be described with reference to the accompanying drawings wherein.

DESCRIPTION OF THE PREFERRED EMBODIMENTS

Figure 1:
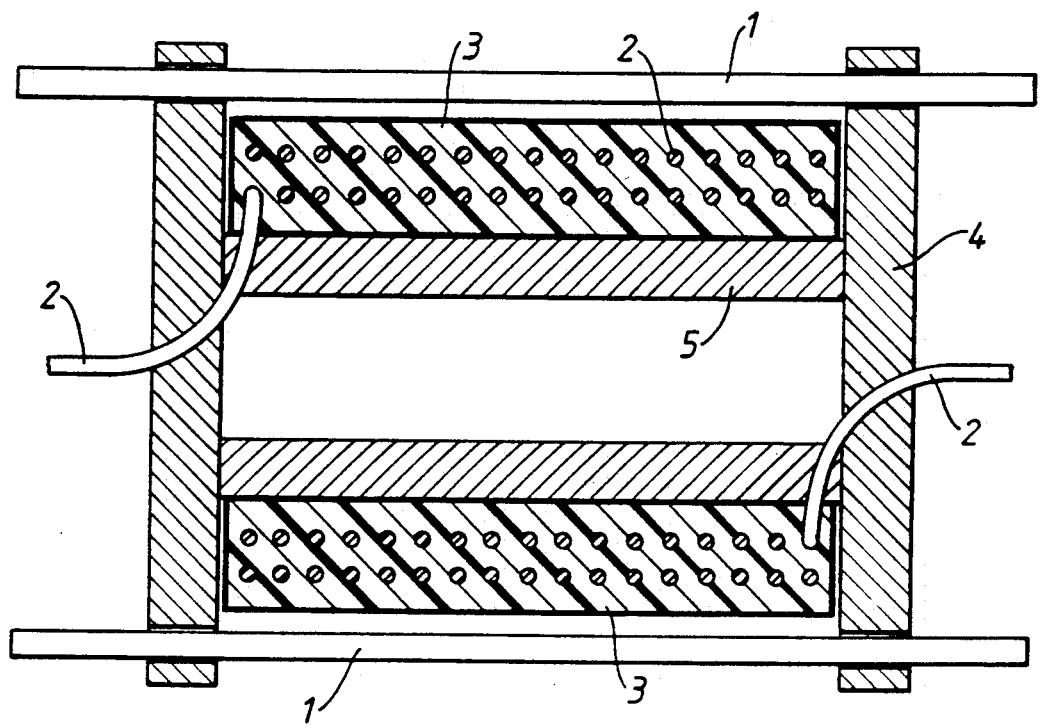
FIG. 1 shows a hydrophone structure for a typical underwater towed array application.

Referring to FIG. 1, a structure for a typical underwater towed array application is shown. Longitudinal strain members, 1 in the array are used to mount the internal equipment, including the hydrophones. A typical hydrophone might be as in the diagram, where the fibre coil 2 is encapsulated in a compressible material 3 and mounted on a rigid former attached to the strain members; the coil assembly is bonded well both to the ends of the bobbin shaped former and to the "axle" 5. Longitudinal balancing is achieved both by the action of the ends 4 and the axle 5, although some balancing could be achieved by either of these acting alone. In the perpendicular direction, it should be noted that the coil, driven symmetrically from within its circumference will always, tend to be balanced, since a compressive force on one part will always be counteracted by opposite effects on another part of the coil.

Figure 2:
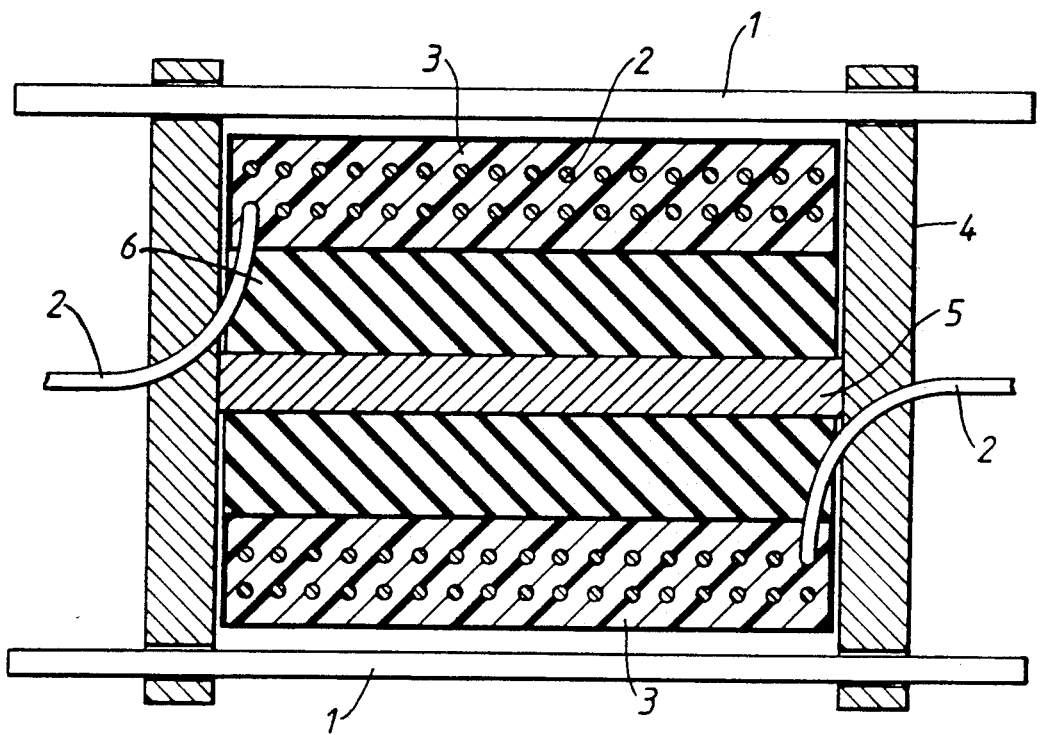
FIG. 2 shows a hydrophone structure employing a secondary material between a coil and a former.

In FIG. 1, the axle part 5 of the rigid mount drives the coil in a perpendicular direction and consequently will achieve balance. By suitable choice of encapsulant material, and rigid mounting material, the acoustic sensitivity of the coil can be maintained. As a generalisation, the encapsulant should be of low bulk modulus, while the mounting should be of light weight, but have stiffness in the required direction. An example of the latter of is a carbon fibre and polyester composite. The rigid mounting material could be made of a light alloy or a rigid theromset material. A variation of this technique is shown in FIG. 2 where a secondary material 6 is used between the coil 2 and the former 4, 5, of lower modulus than the encapsulant 3. This will increase the acoustic sensitivity whilst probably degrading the acceleration response. Air would be ideal from an acoustic viewpoint, but would not provide adequate coupling for vertical inertial compensation. The material 6 an example of which is a low modulus epoxy resin should have a higher compressibility than the encapsulant 3, an example of which is a low modulus epoxy resin. The encapsulant 3 could be rubber or resin epoxy for example.

Figure 3:
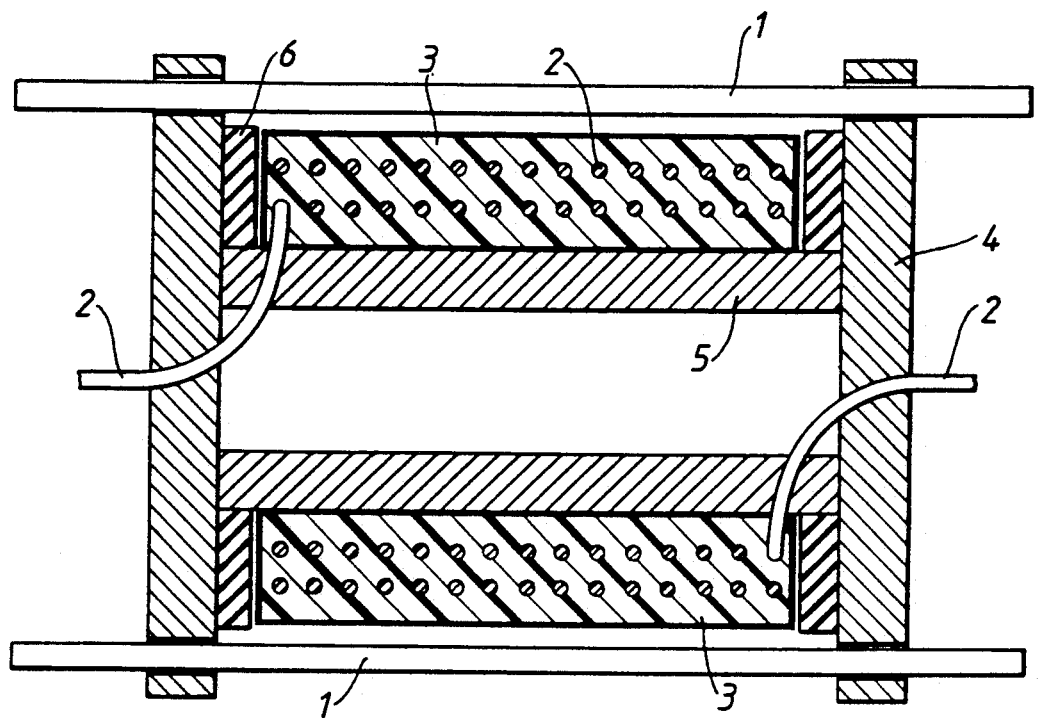
FIG. 3 shows a hydrophone structure where the ends of the coil encapsulant are unconstrained.

Yet another variation is shown in FIG. 3, where the ends of the encapsulant are unconstrained, or rather less constrained than in previous examples. And secondary material 6 is inserted between the former ends 4 and encapsulant 3. If, in this case, the secondary material 6 was left out, hydrostatic pressure, acting on the ends would tend to reduce acoustic sensitivity. By a suitable choice of secondary material 6 or a secondary structure (an oriented composite of isotropic material for example), constraint should be reduced and acoustic sensitivity increased. The relative acceleration sensitivity would be affected by the design and materials used. Examples of secondary materials, which should have a high compliance, i.e. a low Bulk modulus are, air or foamed rubber. The encapsulant 3 would be rubber or epoxy resin, for example. Further examples of suitable hydrophone designs are given in FIGS. 4, 5 and 6.

Figure 4:
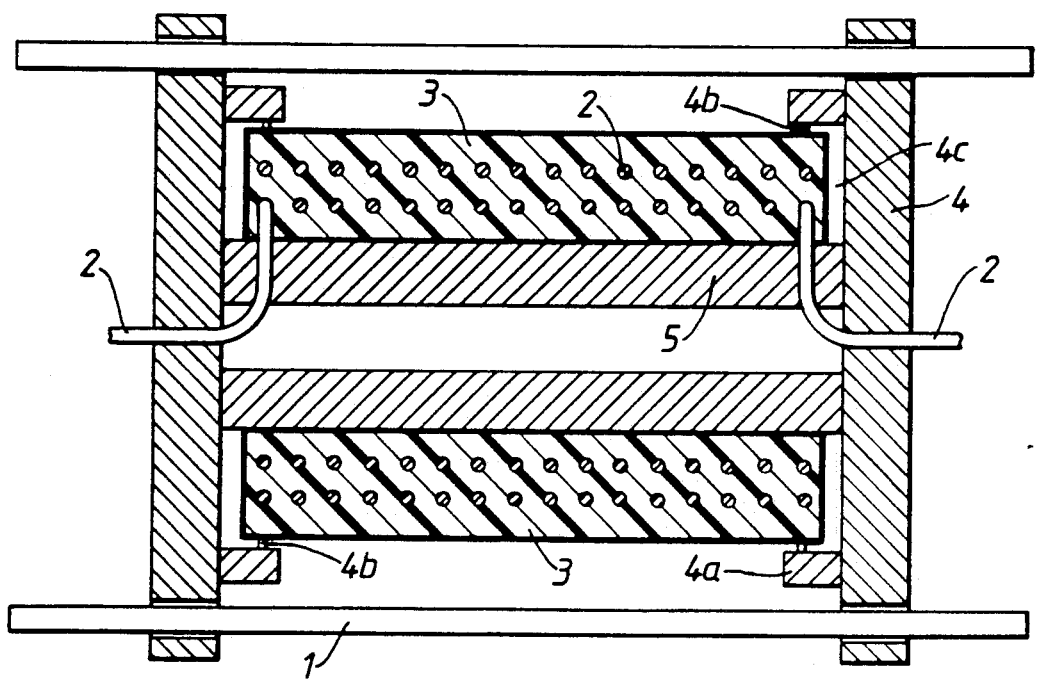
FIG. 4 shows an alternative realisation of the hydrophone structure shown in FIG. 3.

FIG. 4 illustrates an alternative realisation of the concept of FIG. 3, in which the ends of the fibre encapsulant 3 are entirely unconstrained and the secondary material is air contained in gap 4c. The sensitivity to axial acceleration will now be dependent on the rigidity of the encapsulating material, and a material should be selected which yields a suitable compromise between maximum acoustic sensitivity and minimum acceleration sensitivity. The encapsulant 3 is supported on abutments 4a and sealed thereto by, for example, o-rings 4b. The encapsulant 3 could be hard rubber, epoxy or polyester for example.

Figure 5:
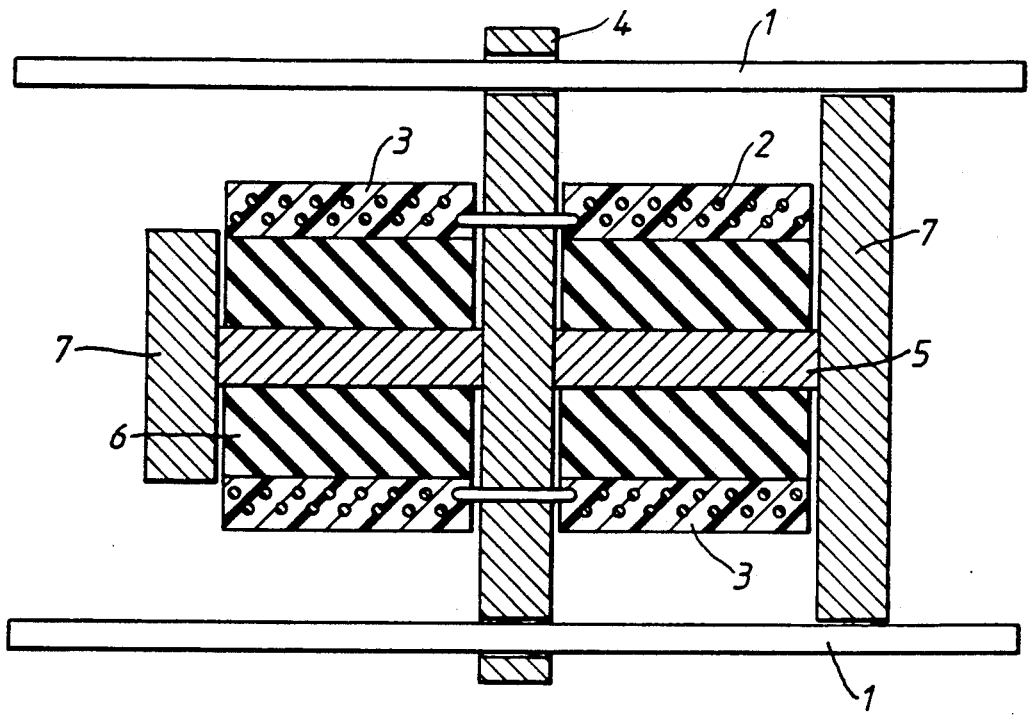
FIG. 5 shows a hydrophone structure in which inertial insensitivity is achieved by driving from the centre; and, FIG. 6 shows a hydrophone structure in which the acoustic sensitivity is enhanced by different means.

FIG. 5 is a design in which inertial insensitivity is achieved by driving from the centre, both axially and radially. In the hydrophone illustrated, the acoustic sensitivity is maximised by appropriate choice of a compressible internal material 6 between the "axle" 5 and the encapsulant 3; this may result in the requirement for end caps 7 as shown. Two examples of end cups are shown, which differ in that the ends of the encapsulant 3 may be either exposed or covered. Examples of high compressible materials are air and polyester resin. The encapsulant 3 could be hard rubber or a low density polyethylene for example. In the example of FIG. 5, fewer layers of fibres 2 would be required to achieve the desired effect.

Figure 6:
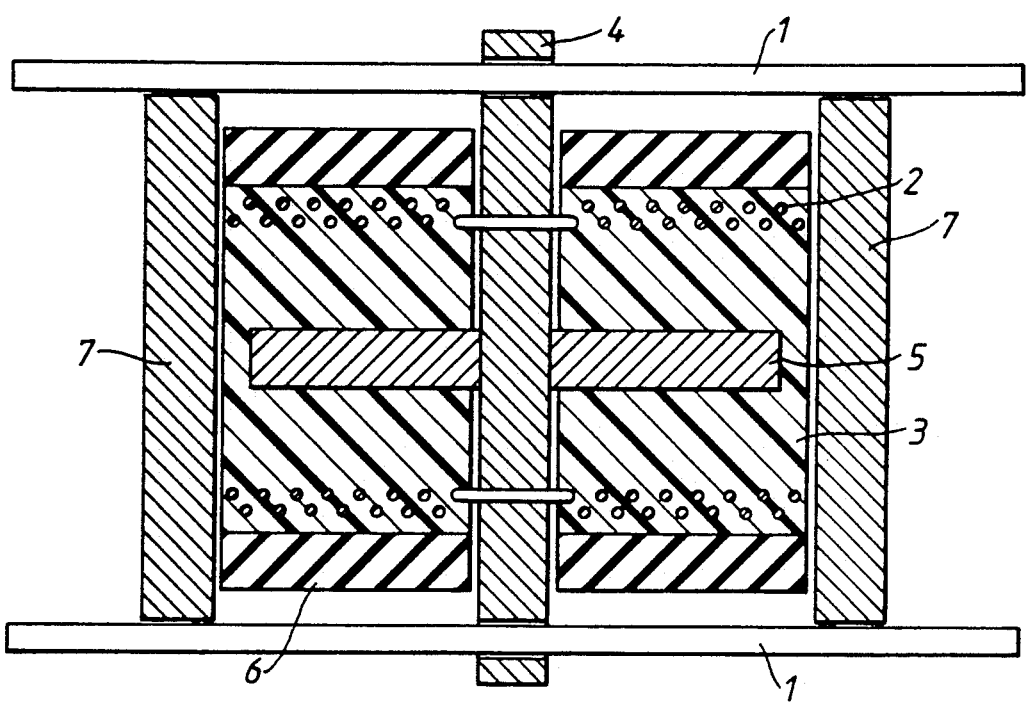

FIG. 6 represents a hydrophone in which the acceleration sensitivity is reduced by ensuring the device is mechanically driven from the centre. The end plates 7 act as piston, transferring pressure to the encapsulated fibre 2, whilst the secondary material 6 allows the encapsulant to expand in the perpendicular direction to an extent dependent upon its properties. The secondary material 6, should be a pressure release material i.e. it reflects sound waves in water, with a phase reversed examples of which are, air, cork with rubber, and foam. The encapsulant material 3 could be soft rubber, or soft epoxy composite.

Finally the structure could be driven from a central flange as in co-pending G. B. application No. 8606552, rather than from an end flange as in the examples above.

It should be noted in FIGS. 1-6 that these arrangements do not necessarily represent the only practical approach. Variations may be envisaged within the scope and spirit of the present invention by those skilled in the art. In particular in FIGS. 1-5, the "axle" could profitably comprise an open ended tube, allowing cables to be routed along the axis of the assembly. Also various examples of encapsulant, secondary material and rigid mount material have been given, and it will be realised that other materials could be suitable.

We claim:

1. A hydrophone comprising a rigid former arranged to be attached to strain members, the rigid former being arranged to accommodate an encapsulant material in which is embedded an optical fibre coil, wherein the rigid former is of bobbin shape and comprises an axle part which drives the coil in a perpendicular direction, and end parts, the axle and end parts providing longitudinal balancing for the hydrophone.

2. A hydrophone as claimed in claim 1, wherein a secondary material is provided between the rigid former and the encapsulant material, the secondary material being of lower modulus than the encapsulant material.

3. A hydrophone as claimed in claim 2, wherein the rigid former comprises a central section and an axle part orthogonal thereto, said axle part having respective end flanges connected thereto.

4. A hydrophone as claimed in claim 1 wherein a secondary material is provided which surrounds the encapsulant material, the secondary material being of lower modulus than the encapsulant material.

5. A hydrophone as claimed in claim 4 wherein the rigid former comprises a central section and an axle part orthogonal thereto, respective end parts are provided, remote from the axle part, which act as a piston transferring pressure to the encapsulant material.

6. A hydrophone as claimed in claim 5 wherein the rigid former is of an alloy material.

7. A hydrophone as claimed in claim 6, wherein the encapsulant material is bonded to the rigid former.

8. A hydrophone as claimed in claim 1, wherein the secondary material surrounds the axle part, and spaces the encapsulant material therefrom.

9. A hydrophone as claimed in claim 1 wherein the secondary material in positioned between the encapsulant and the end parts.

10. A hydrophone as claimed in claim 1 wherein the former material is a carbon fibre polyester composite.

* * * * *